United States Patent
Little (10) Patent No.: US 8,650,215 B2
(45) Date of Patent: Feb. 11, 2014

(54) DECOY APPLICATION SERVERS

(75) Inventor: Mark Cameron Little, Ebchester (GB)

(73) Assignee: Red Hat, Inc., Raleigh, NC (US)

( * ) Notice: Subject to any disclaimer, the term of this patent is extended or adjusted under 35 U.S.C. 154(b) by 210 days.

(21) Appl. No.: 12/773,758

(22) Filed: May 4, 2010

(65) Prior Publication Data

US 2011/0276597 A1    Nov. 10, 2011

(51) Int. Cl.
G06F 17/30 (2006.01)
(52) U.S. Cl.
USPC .......................................... 707/782
(58) Field of Classification Search
USPC .................................. 707/781, 782
See application file for complete search history.

(56) References Cited

U.S. PATENT DOCUMENTS

| | | | |
|---|---|---|---|
| 7,694,339 B2 * | 4/2010 | Blake et al. ...................... | 726/23 |
| 7,962,756 B2 * | 6/2011 | Fagone et al. ................. | 713/188 |
| 8,015,605 B2 * | 9/2011 | Yegneswaran et al. ......... | 726/22 |
| 2002/0046351 A1 * | 4/2002 | Takemori et al. ............. | 713/201 |
| 2002/0112190 A1 * | 8/2002 | Miyagawa et al. ............ | 713/201 |
| 2002/0157020 A1 * | 10/2002 | Royer ............................ | 713/201 |
| 2006/0288414 A1 * | 12/2006 | Kuroda .......................... | 726/24 |
| 2008/0282339 A1 * | 11/2008 | Nakae et al. .................... | 726/13 |
| 2009/0241191 A1 * | 9/2009 | Keromytis et al. ............. | 726/23 |
| 2010/0077483 A1 * | 3/2010 | Stolfo et al. .................... | 726/24 |
| 2010/0235919 A1 * | 9/2010 | Adelstein et al. .............. | 726/25 |

OTHER PUBLICATIONS

Piscitello, Dave, "Honeypots: Sweet Idea, Sticky Business," WatchGuard LiveSecurity, 2001, 3 pages, WatchGuard Technologies, Inc. http://www.corecom.com/external/livesecurity/honeypots.html.
Sanchez, Sandra L., "The JDBC Connection," May 30, 2000, 8 pages. http://aspen.ucs.indiana.edu/webtech/jdbc/overviewpaper/JDBCconn.html.
"Symantec Decoy Server 3.1 Implementation Guide," 2003, 176 pages, Symantec Corporation.
"Symantec ManHunt 3.0 Administration Guide," 2003, 392 pages, Symantec Corporation.

* cited by examiner

*Primary Examiner* — Khanh Pham
(74) *Attorney, Agent, or Firm* — Lowenstein Sandler LLP (57) ABSTRACT

A computing device, executing a decoy application server that does not have access to real data, receives a service request from a client. The decoy application server protects a designated application server, wherein the decoy application server and the designated application server include instances of a single Java application server program. The decoy application server establishes a connection to a false database via a decoy Java Database Connectivity (JDBC) driver. The decoy application server retrieves false data from the false database, and provides the false data to the client.

20 Claims, 7 Drawing Sheets

Designated Application Server
Software Architecture 300

Decoy Application Server
Software Architecture 350

DECOY APPLICATION SERVERS

TECHNICAL FIELD

Embodiments of the present invention relate to distributed computing, and more specifically to the use of decoy application servers to reduce an application server's vulnerability to hackers.

BACKGROUND

Any server that provides services or data over a network is vulnerable to attack by malicious software and individuals (commonly known as hackers). There are numerous techniques that can be used to attack an application server for the purpose of disabling the application server or gaining access to information on the application server. Such attacks include, for example, denial of service attacks, use of stolen credentials/passwords to access the application server, use of software security flaws to control or access the application server, etc. Accordingly, there is a continuing need to protect application servers from attacks.

BRIEF DESCRIPTION OF THE DRAWINGS

The present invention is illustrated by way of example, and not by way of limitation, in the figures of the accompanying drawings and in which.

DETAILED DESCRIPTION

Described herein is a method and apparatus for protecting application servers using decoy application servers. In one embodiment, a decoy application server that does not have access to real data receives a service request from a client. The decoy application server protects a designated application server, wherein the decoy application server and the designated application server include instances of a single Java application server program. The decoy application server establishes a connection to a false database via a decoy Java® Database Connectivity (JDBC) driver. The false database may be a real database that includes false data, or may be a component of the decoy JDBC driver that responds to database queries. The decoy application server retrieves false data from the false database, and provides the false data to the client. In one embodiment, the false data is generated by the JDBC driver in response to a request from the decoy application server for data.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed description which follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving", "establishing", "retrieving", "providing", "loading" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

A machine-readable medium includes any mechanism for storing information in a form readable by a machine (e.g., a computer). For example, a machine-readable medium includes a machine readable storage medium such as a read only memory ("ROM"), random access memory ("RAM"), magnetic disk storage media, optical storage media, flash memory devices, etc.

Figure 1:
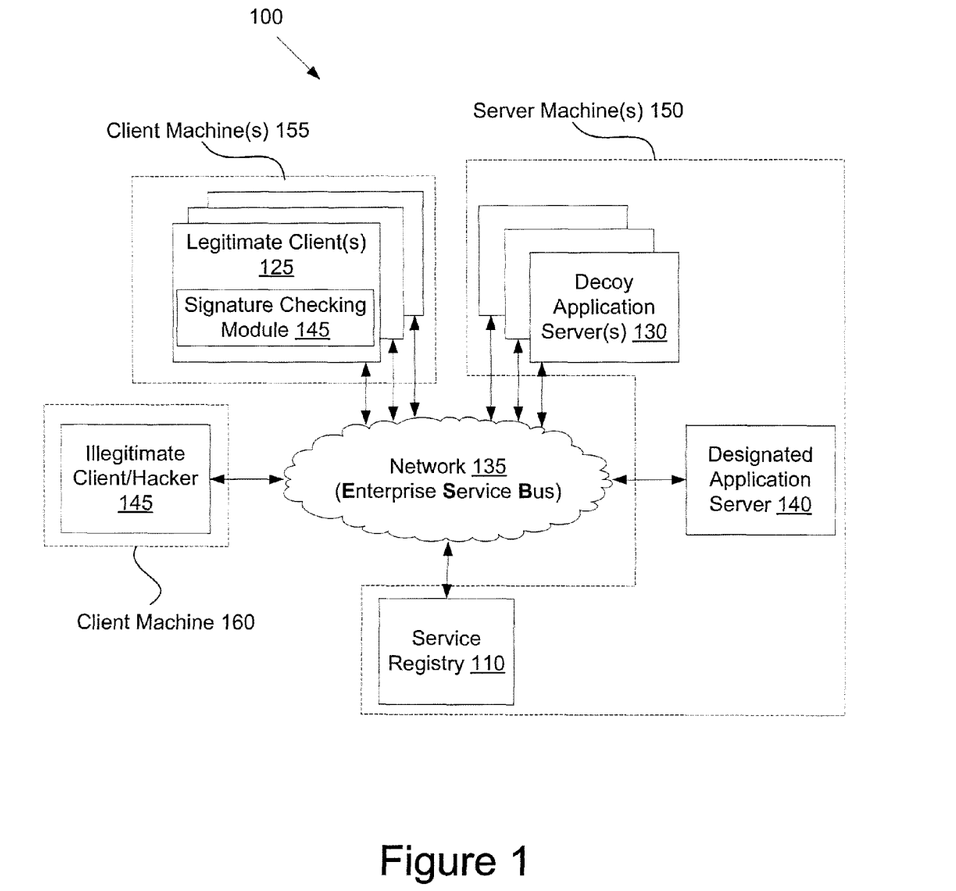
FIG. 1 illustrates an exemplary distributed computing system, in which embodiments of the present invention may operate.

FIG. 1 illustrates an exemplary distributed computing system 100, in which embodiments of the present invention may operate. In one embodiment, the distributed computing system 100 includes a service oriented architecture (SOA). A service oriented architecture (SOA) is an information system architecture that organizes and uses distributed capabilities (services) for one or more applications. SOA provides a uniform means to offer, discover, interact with and use capabilities (services) distributed over a network. Through the SOA, applications may be designed that combine loosely coupled and interoperable services.

The distributed computing system 100 may include legitimate clients 125, illegitimate clients 145, a designated application server 140 (or multiple designated application servers), one or more decoy application servers 130, and a service repository 110 (also known as a domain server) connected via a network 135. The network 135 may be a public network (e.g., Internet), a private network (e.g., Ethernet or a local area Network (LAN)), or a combination thereof. In one embodiment, the network 135 includes an enterprise service bus (ESB). An ESB is an event-driven and standards-based messaging engine that provides services for more complex architectures. The ESB provides an infrastructure that links together services and clients to enable distributed applications and processes. The ESB may be implemented to facilitate an SOA. In one embodiment, the ESB is a single bus that logically interconnects all available services and clients. Alternatively, the ESB may include multiple busses, each of which may logically interconnect different services and/or clients.

Clients (including legitimate clients 125 and illegitimate clients 145) are applications that run on client machines 155, 160, such as for example, personal computers (PC), palm-sized computing devices, personal digital assistants (PDA), etc. In the SOA, clients include applications that access services provided by application servers. Clients may be fat clients (clients that perform local processing and data storage), thin clients (clients that perform minimal or no local processing and minimal to no data storage), and/or hybrid clients (clients that perform local processing but little to no data storage).

Legitimate clients 125 are clients that make legitimate use of services provided by the designated application server 140. Legitimate clients 125 are authorized to use the services provided by the designated application server 140, and may be associated with particular usernames and passwords, which may be used to access the services of the designated application server 140. Legitimate clients 125 may have purchased, licensed or otherwise gained legal right to utilize those services, and may include specialized software for interacting with the designated application server 140.

Illegitimate clients 145 are clients that are not authorized to use services offered by the designated application server 140. Illegitimate clients 145 may be hackers that are intent on crashing the designated application server 140, stealing information from the designated application server 140, or otherwise making illegal or unauthorized use of the designated application server 140. Illegitimate clients 145 typically have no relationship with the designated application server 140, and attempt to find avenues of attack such as by sniffing network traffic and/or obtaining port and address information for the designated application server from the service registry 110.

Designated application servers 140 provide one or more services to legitimate clients 125. The offered services may be discretely defined sets of contiguous and autonomous functionality (e.g., business functionality, technical functionality, etc.). Each service may represent a process, activity or other resource that can be accessed and used by other services or clients on network 135. Each of the services provided by the designated application server 140 may be independent of other services, and may be accessed without knowledge of its underlying platform implementation. Examples of provided services include banking services, travel booking services, electronic retail services, and so on.

Decoy application servers 130 appear to provide the same services to clients as the designated application server 140, but provide only or primarily false data. In one embodiment, designated application server 140 and decoy application servers 130 include instances of the same application server program. Thus, the designated application server 140 and decoy application servers 130 may appear to be identical to clients. Therefore, it may be difficult or impossible for an unauthorized client 145 to determine which application servers are designated application servers 140 and which are decoy application servers 130.

For an illegitimate client 145 to gain access to real data provided by the designated application server 140, the illegitimate client 145 must first hack into the correct application server. If the illegitimate client 145 successfully hacks into a decoy application server 130, the illegitimate client will be unable to steal data. Moreover, crashing the decoy application server using, for example, a denial of service attack, has no effect on the designated application server's 140 ability to provide services to legitimate clients 125.

In a preferred embodiment, there are more decoy application servers 130 than designated application servers 140. Accordingly, the illegitimate client 145 has a statistically lowered chance of accessing real data. Moreover, denial of services attacks also have a statistically lowered chance of shutting down the designated application server 140.

Designated application server 140 and decoy application servers 130 may be resident on server machines 150, which may be personal computers (PC), rackmount servers, routers, etc. Designated application server 140 may run on the same machine as one or more decoy application servers 130, or may run on a separate machine. Additionally, one or more decoy application servers 130 may run on the same machine, or all decoy application servers 130 may run on separate machines. Where multiple application servers (e.g., designated application servers and/or decoy application servers) run on the same machine, each application server may have its own address and may operate on independent ports. In one embodiment, server machines 150 are deployed into a cluster. This may reduce an illegitimate client's ability to distinguish between designated application servers and decoy application servers.

Service repository 110 includes a list of all services in the distributed computing system 100, including a list of all application servers (including decoy application servers 130 and designated application servers 140) that provide those services. Service repository 110 is hosted by a server machine 150, which may be the same server machine hosting a real and/or decoy application server. In addition to maintaining a list of services and application servers, service repository 110 also includes information about those services and application servers, such as a service's business application (e.g., bank, travel agency, etc.), how to get messages to the service (e.g., using JMS or HTTP), quality of service requirements (e.g., transactional, secure, etc.) and all additional data necessary to communicate with those services and/or application servers.

In one embodiment, each entry for an application server in the service registry 110 includes a unique signature value (e.g., a hash value) which identifies whether that application server is a decoy application server 130 or a designated application server 140. Legitimate clients 125 may include a signature checking module 125 that can identify designated application servers 140 based on their associated signature values.

When a legitimate client 125 queries the service registry 110 for a desired service, multiple results are returned. Each result may include a unique signature value. The signature checking module 145 processes each of the unique signature values. Those signature values that match predetermined criteria are determined to be associated with designated application servers. Those signature values that fail to match the predetermined criteria are determined to be associated with decoy application servers 130. For example, signature values from designated application servers, when processed by a key-checking algorithm, may be validated. In contrast, signature values from decoy application servers, when processed by a key-checking algorithm, may be identified as invalid. The legitimate client 125 may then send a service request to an application server that has been identified as a designated application server 140. Since illegitimate clients 145 lack the signature checking module 145, they are unable to accurately distinguish between designated application servers 140 and decoy application servers 130.

In some instances, an illegitimate client 145 may be able to make an educated guess as to which application server is a designated application server 140 by using a packet sniffer to monitor network traffic (e.g., to observe sources and destinations of network traffic). Those application servers that receive a bulk of network traffic may be identified by the illegitimate client 145 as probable designated application servers 140. Accordingly, in one embodiment, decoy service requests and service responses are sent to and from the decoy application servers 130 to further mask the identity of the designated application server 140.

Figure 2:
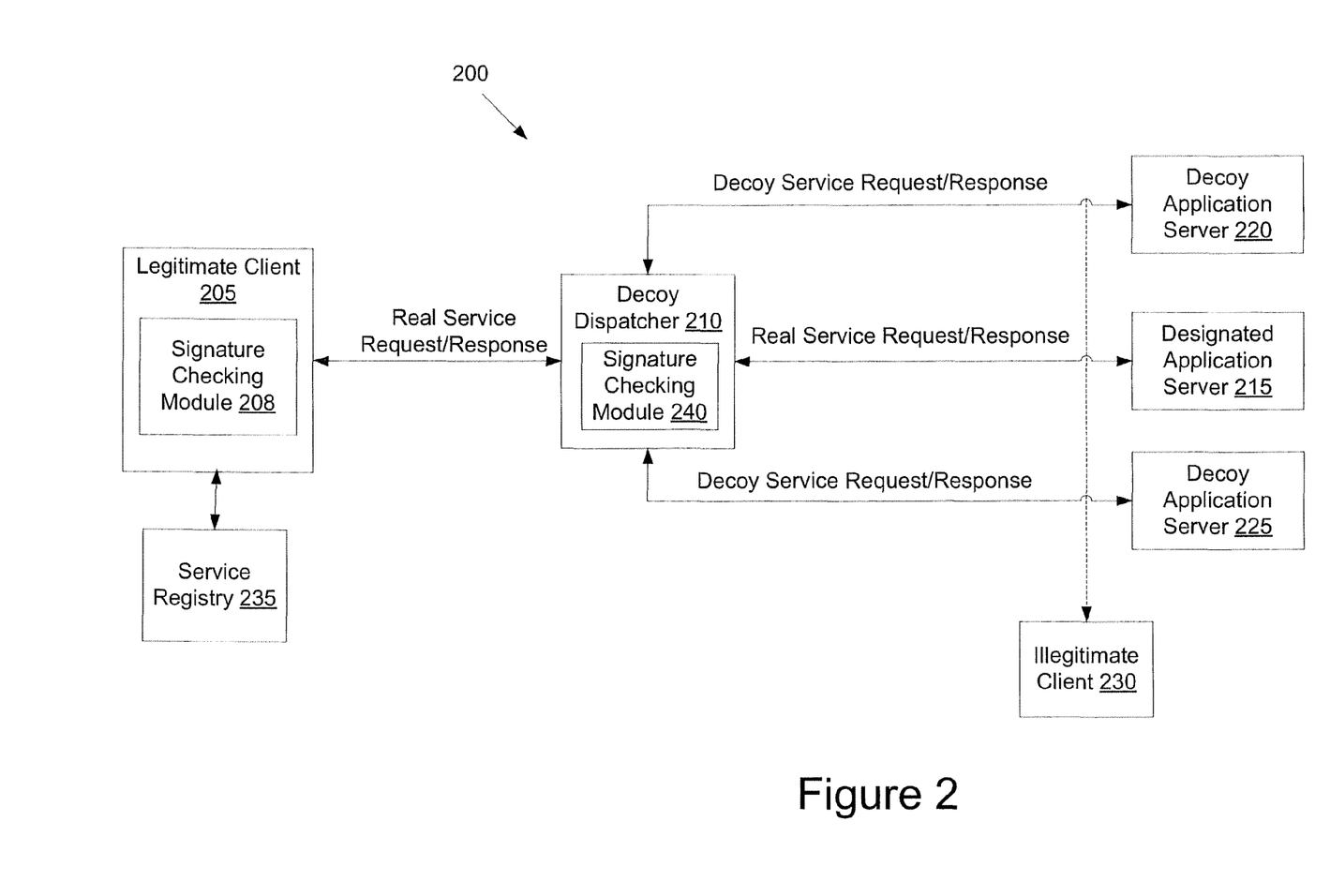
FIG. 2 illustrates one embodiment of a distributed computing system, in which decoy service requests are used.

FIG. 2 illustrates one embodiment of a distributed computing system 200, in which decoy service requests are used. Distributed computing system 200 may correspond to distributed computing system 100 of FIG. 1. In distributed computing system 200, a legitimate client may 205 queries a service registry 235 for an application server, and receives multiple results, some of which are for designated application servers and some of which are for decoy application servers. Signature checking module 208 checks the results to identify designated application server 215 as described above.

Legitimate client 205 generates a real service request and sends it to decoy dispatcher 210. Decoy dispatcher 210 is a dispatcher (a specialized service that receives a message as an input, performs an operation, and outputs the message) that is configured to generate decoy copies of real service requests, and propagate the decoy service requests to decoy application servers 220, 225. In one embodiment, the decoy dispatcher 210 maintains a list of decoy application servers (e.g., decoy application server 220 and 225), and generates decoy service requests for one or more of those decoy application servers upon receiving a real service request. Alternatively, the legitimate client 205 may identify which decoy application servers for decoy dispatcher 210 to send decoy service requests to.

Decoy dispatcher 210 forwards the real service request to the designated application server 215, and sends decoy service requests to one or more decoy application servers (e.g., decoy application server 220 and 225). The designated application server 215 performs one or more requested operations, and provides real data in a real service response, which it sends back to legitimate client 205. Each of the decoy application servers 220, 225 also perform one or more operations that were requested by the decoy service requests. The requested operations may be the same as the operation requested in the real service request, or may be different operations. The decoy application servers 220, 225 then send decoy service responses back to the legitimate client 205. These decoy service responses typically do not contain any real data.

In one embodiment, the decoy dispatcher 210 intercepts the real service response and decoy service responses. The decoy dispatcher 210 then determines which of the received service responses is a real service response, and forwards that service response to legitimate client 205. In one embodiment, each service response includes a unique signature value associated with the application server that generated the service response. Decoy dispatcher 210 may include a signature checking module 240 that processes the signature values included in the service responses to identify which of the service responses are real service responses. In an alternate embodiment, the decoy service responses and real service responses are received by legitimate client 205, which determines which responses are real responses and which responses are decoy responses. Alternatively, decoy service responses may not be sent back to legitimate client 205 or decoy dispatcher 210.

As illustrated, an illegitimate client 230 may be sniffing the network in an attempt to determine addresses and ports of application servers to attack. However, illegitimate client 230 collects the address and port information of decoy application servers 220, 225 as well as designated application server 215. Therefore, the illegitimate client 230 does not know which of the application servers to attack. The greater the ratio of decoy application servers to designated application servers, the lower the probability that the illegitimate client 230 will attack a designated application server 215.

Figure 3:
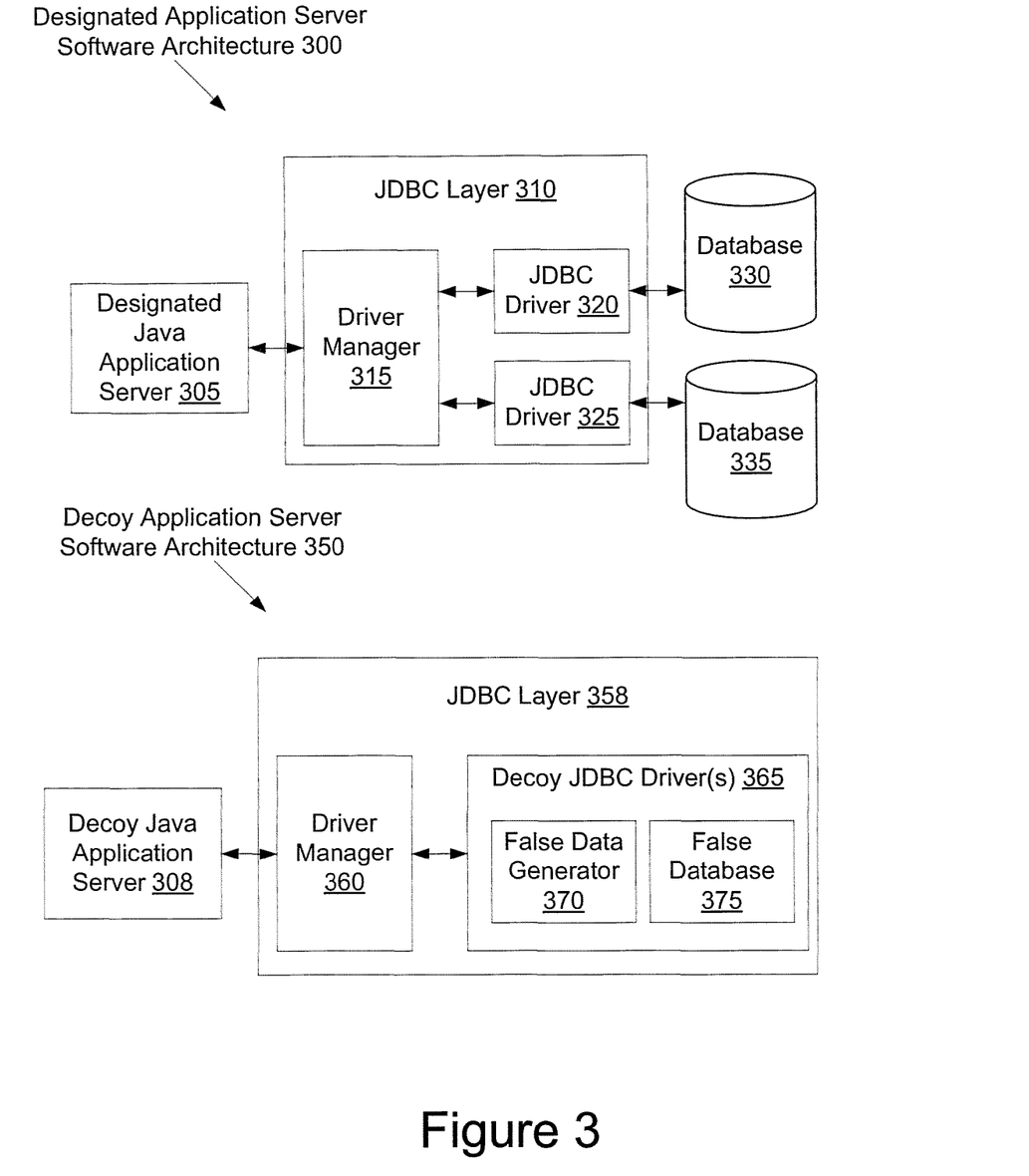
FIG. 3 illustrates a block diagram of a designated application server and of a decoy application server, in accordance with one embodiment of the present invention.

FIG. 3 illustrates a block diagram of a designated application server software architecture 300 and of a decoy application server software architecture 350, in accordance with one embodiment of the present invention. The designated application server software architecture 300 includes a real Java application server 305 and the decoy application server software architecture 350 includes a decoy Java application server 308. In one embodiment, the real Java application server and the decoy Java application server 308 are instances of the same Java application server program. Therefore, in one embodiment the program code of the real Java application server 305 and the decoy Java application server 308 are identical. Thus, real Java application server 305 and decoy Java application server 308 can perform the same services for clients. The only difference between these provided services may be that the services provided by the decoy Java application server 308 are based on fictional data, whereas those provided by the real Java application server 305 are based on real data. This can make detection of decoy Java application servers 308 very difficult. Moreover, when the same java application server program is used for both the real Java application server 305 and the decoy Java application server 308, an enterprise does not need to invest in special decoy server programs (e.g., such as honey pot programs) to provide decoy application servers.

In the designated application server software architecture 300, the real java application server 305 is connected to (or includes) a Java Database Connectivity (JDBC) layer 310. The JDBC layer 310 is an application programming interface (API) that defines how the real Java application server 305 may access a database. The JDBC layer 310 provides methods for both querying and updating a database.

The JDBC layer 310 includes a driver manager 315 that creates JDBC connections to databases or other data stores. JDBC connections are established by searching for JDBC drivers 320, 325 that are registered with the driver manager 315 for connecting to particular databases (or other data stores) or particular types of databases. For example, the JDBC layer 310 in designated application server 300 includes a first JDBC driver 320 for connecting to database 330 and a second JDBC driver 325 for connecting to database 335. Database 330 and database 335 may be the same or different database types, such as Oracle® databases, DB2 databases, PostgreSQL® databases, and so on.

Each JDBC driver 320, 325 is an adapter installed on the application server machine that hosts the designated application server 300. The JDBC drivers 320, 325 convert requests from Java programs to a protocol that a particular database 320, 325 can understand. Each JDBC driver 320, 325 may establish connections to an appropriate database 330, 335, and may then issue commands or queries to the database 330, 335 using, for example, structured query language (SQL) or another language. JDBC connections support update statements such as SQL's create, insert, update and delete statements and query statements such as SQL's select statement. Once the JDBC layer 310 establishes a connection between a database 330, 335 and the real Java application server 305 using an appropriate JDBC driver 320, 325, the real Java application server 305 may then retrieve data from the database using a database query mechanism. For example, when a business object (e.g., a Java application) needs data from a database 330, 335, the real Java application server 305 requests a connection to the database 330, 335. Once the connection is established, the real Java application server can issue, for example, SQL statements to the database 330, 335.

Similar to designated application server software architecture 300, in decoy application server software architecture 350 the decoy Java application server 308 is connected to a JDBC layer 358, which includes a driver manager 360. However, unlike JDBC layer 310 of the designated application server software architecture 300, JDBC layer 358 includes one or more decoy JDBC driver(s) 465, and may not include any additional JDBC drivers (e.g., for connecting to real databases). In one embodiment, the decoy JDBC driver 365 does not connect to any databases or other data stores. Instead, when the decoy JDBC driver 365 receives a request to connect to a database, it connects to a fictitious or false database 375, which it may generate. Thereafter, whenever the decoy Java application server 308 queries the false database 375 (e.g., issues an SQL query statement to the false database 375), the decoy JDBC driver 365 provides false data to the decoy Java application server 308. To the decoy Java application server 308, it appears as though it is receiving data from a real database. For example, the decoy JDBC driver 365 provides false data that is formatted in a manner that the decoy Java application server 308 expects. The false data may be stored in pre-generated false database 375 that is a component of the JDBC driver 365. Alternatively, the decoy JDBC driver 370 may generate the false data on-the-fly using a false data generator 370. In such an embodiment, the false database 375 may include merely a database name and/or address.

In one embodiment, JDBC layer 358 includes a single decoy JDBC driver 365 that can emulate connections to all types of databases and/or other databases. Alternatively, JDBC layer 358 may include multiple decoy JDBC drivers, each of which emulates a connection to one or more different types of data stores.

In one embodiment, the decoy JDBC driver 365 connects to a real database (not shown) that includes false data. In such an embodiment, the decoy JDBC driver 365 may not include a false database 375 or a false data generator 370.

In addition to responding to database queries to a false database 375, the decoy JDBC driver 365 may also respond to update statements such as SQL's create, insert, update and delete statements. For insert, create and update statements, the decoy JDBC driver 365 may temporarily store data received from the decoy Java application server 308. Therefore, if the decoy Java application server 308 later requests that data during a current session, the decoy JDBC driver 365 may retrieve the data from the temporary storage and return it to the decoy Java application server 308. Once the current session is terminated, the decoy JDBC driver 365 may delete the data from the temporary location.

Decoy Java application servers 308 may be initiated simply by loading a Java application server program and connecting the Java application server program to a JDBC layer 358 that includes a decoy JDBC driver 365. This enables decoy Java application servers 308 to be easily initiated as needed. In one embodiment, multiple decoy Java application servers 308 are initiated automatically when a real Java application server 305 is initiated, using the same Java application server program code.

Figure 4:
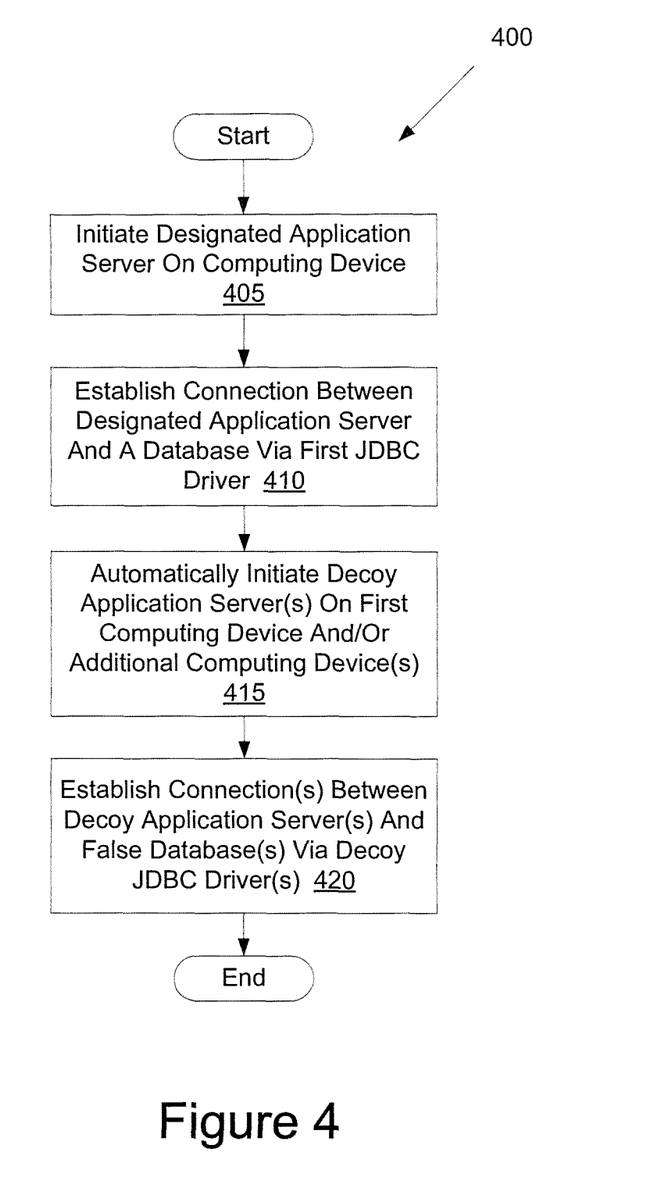
FIG. 4 illustrates a flow diagram of one embodiment for a method of providing decoy application servers.

FIG. 4 illustrates a flow diagram of one embodiment for a method 400 of providing decoy application servers. The method may be performed by processing logic that may comprise hardware (e.g., circuitry, dedicated logic, programmable logic, microcode, etc.), software (such as instructions run on a processing device), or a combination thereof. In one embodiment, method 400 is performed by one or more server machines 150 of FIG. 1 executing decoy application server 130.

Referring to FIG. 4, at block 405 of method 400 a designated application server is initiated on a computing device. At block 410, processing logic establishes a connection between the designated application server and a database via a first JDBC driver that is loaded into a JDBC layer. The connection may be established when the application server is initiated or upon request by a business object (e.g., a Java application). In one embodiment, the connection is established via a JDBC driver that is configured to communicate with the database. Once the connection is established, database query statements and update statements may be sent to the database, and real data may be obtained from the database.

At block 415, one or more decoy application servers are automatically initiated on the computing device and/or on one or more additional computing devices. In one embodiment, the decoy application server executes the same application server program code as the designated application server. Therefore, the decoy application server may be automatically initiated using a modified server replication technique. With standard server replication techniques (e.g., as used for high availability or load balancing), additional designated application servers would be initiated. However, the modified server replication initiates copies of the same server program, but initiates them with the incorporation of a JDBC layer that includes a decoy JDBC driver. Other than the inclusion of the decoy JDBC driver, the decoy application servers may be identical to the designated application server.

At block 420, processing logic establishes a connection between the decoy application server and a false database via the decoy JDBC driver. The connection between the false database and the decoy application server may not be a connection to an actual database. Instead, the decoy JDBC driver may itself mimic a database, and may respond to database update and query statements, for example, without connecting to any database. Responses to such database statements may include false data generated dynamically (on-the-fly) by the decoy JDBC driver. Therefore, it appears to business objects (e.g., Java applications) as though they are communicating with a real database, even though no database exists.

Figure 5:
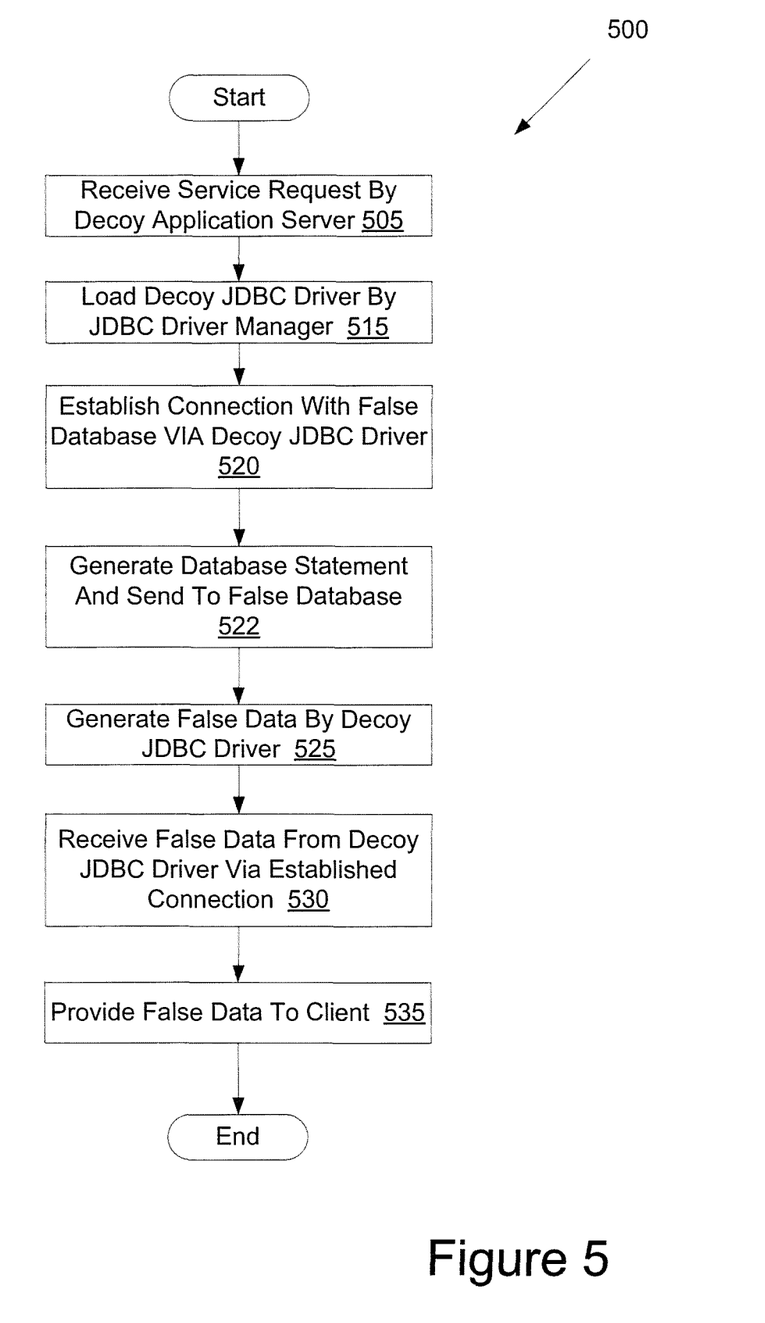
FIG. 5 illustrates a flow diagram of another embodiment for a method of providing a decoy application server.

FIG. 5 illustrates a flow diagram of another embodiment for a method 500 of providing a decoy application server. The method may be performed by processing logic that may comprise hardware (e.g., circuitry, dedicated logic, programmable logic, microcode, etc.), software (such as instructions run on a processing device), or a combination thereof. In one embodiment, method 500 is performed by one or more server machines 150 of FIG. 1.

Referring to FIG. 5, at block 505 of method 500 decoy application server receives a service request. The service request may be received from a client of the decoy application server. The decoy application server may determine that in order to satisfy the service request, the decoy application server needs to communicate with a particular database or a particular database type.

At block 515, the decoy application server uses an API for a JDBC layer to establish a connection to a false database that appears to be a database of the particular type. In one embodiment, a JDBC driver manager included in the JDBC layer loads a decoy JDBC driver that is configured to establish connections to databases of the particular database type. At block 520, the JDBC layer establishes a connection between the decoy application server and a false database via the decoy JDBC driver. The JDBC layer then returns a connection object to the decoy application server that enables the decoy application server to communicate with the false database.

At block 522, the decoy application server generates a database statement (e.g., an update statement or query statement) and sends it to the false database via the established connection. At block 525, the decoy JDBC driver generates false data in response to receiving the database statement. At block 530, the decoy application server receives the false data from the decoy JDBC driver via the established connection. The false data has contents and a format that the decoy application server is expecting. Therefore, it appears to the decoy application server as though the data came from an actual database.

At block 535, the decoy application server provides the false data to the client. The method then ends.

Methods 400 and 500 can be performed to mask the identity of a designated application server. This may reduce a likelihood that a hacker will gain access to the designated application server or shut down the designated application server.

Figure 6:
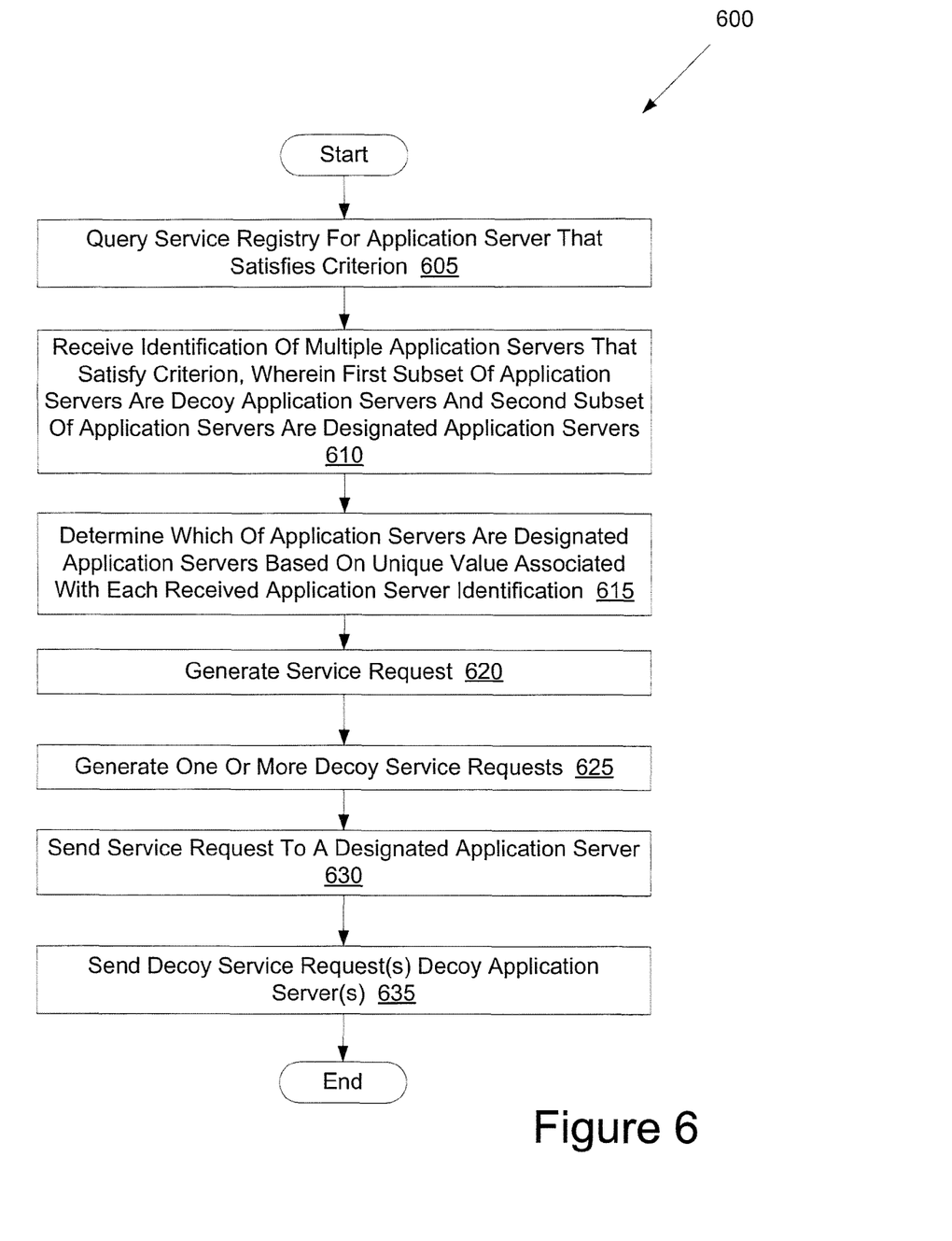
FIG. 6 illustrates a flow diagram of one embodiment for a method of masking the identity of a designated application server.

FIG. 6 illustrates a flow diagram of one embodiment for a method 600 of masking the identity of a designated application server. The method may be performed by processing logic that may comprise hardware (e.g., circuitry, dedicated logic, programmable logic, microcode, etc.), software (such as instructions run on a processing device), or a combination thereof. In one embodiment, method 600 is performed by a client machine 155 of FIG. 1.

Referring to FIG. 6, at block 605 of method 600 a client queries a service registry for an application server that satisfies a criterion.

At block 610, the client receives identification of multiple application servers that satisfy the criterion, wherein a first subset of the application servers are decoy application servers and a second subset of the application servers are designated application servers.

At block 615, the client determines which of the application servers are designated application servers based on a unique signature value associated with each received application server identification. Those signature values that meet designated application server criteria may be determined to be associated with designated application servers, while those signature values that fail to meet the criteria may be determined to be associated with decoy application servers.

At block 620, the client generates a real service request. At block 625, the client generates one or more decoy service requests. At block 630, the client sends the real service request to a designated application server. At block 635, the client sends the decoy service requests to decoy application servers. The decoy service requests may be generated by a decoy dispatcher that intercepts outgoing service requests.

Figure 7:
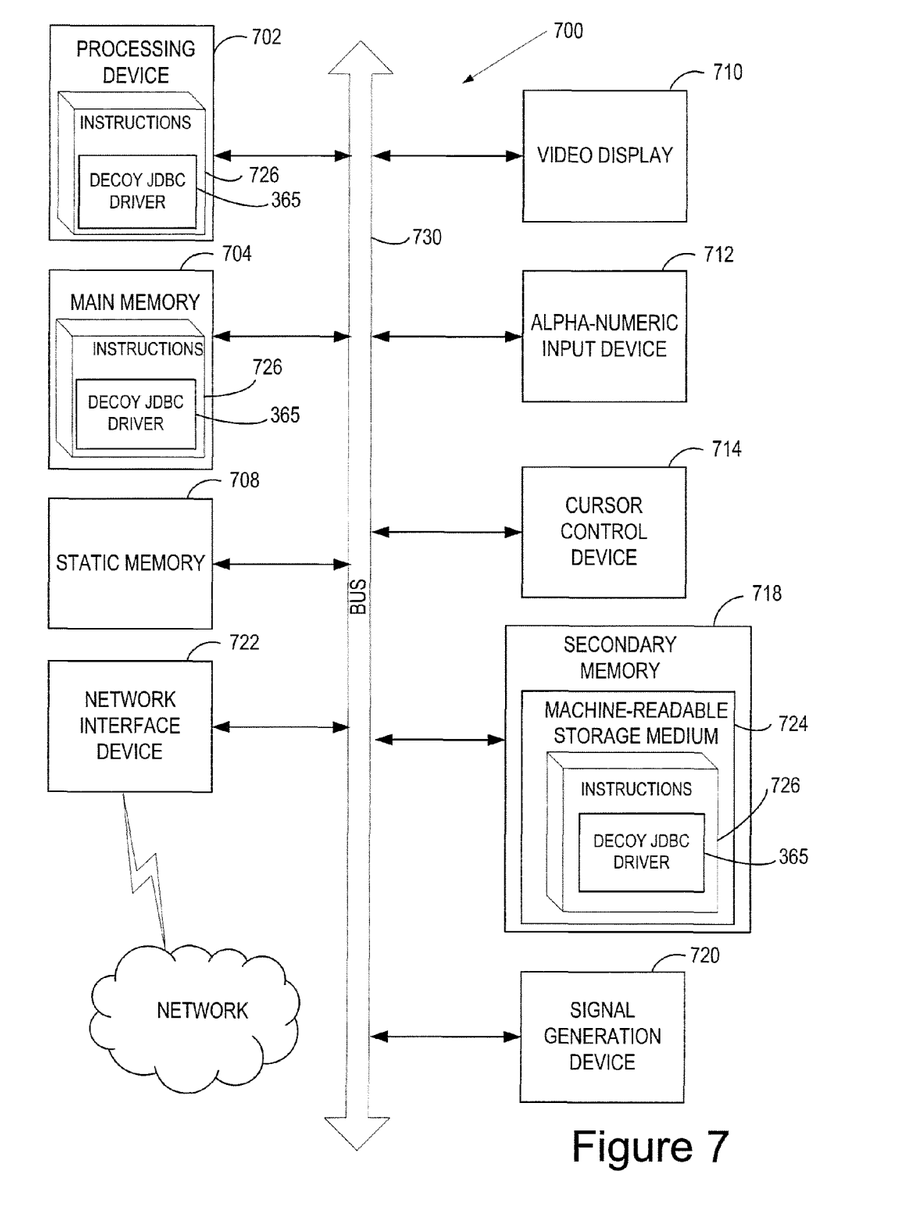
FIG. 7 illustrates a block diagram of an exemplary computer system, in accordance with one embodiment of the present invention.

FIG. 7 illustrates a diagrammatic representation of a machine in the exemplary form of a computer system 700 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 700 includes a processing device 702, a main memory 704 (e.g., read-only memory (ROM), flash memory, dynamic random access memory (DRAM) such as synchronous DRAM (SDRAM) or Rambus DRAM (RDRAM), etc.), a static memory 708 (e.g., flash memory, static random access memory (SRAM), etc.), and a secondary memory 718 (e.g., a data storage device such as a hard disk drive), which communicate with each other via a bus 730.

Processing device 702 represents one or more general-purpose processing devices such as a microprocessor, central processing unit, or the like. More particularly, the processing device 702 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 702 may also be one or more special-purpose processing devices such as an application specific integrated circuit (ASIC), a field programmable gate array (FPGA), a digital signal processor (DSP), network processor, or the like. The processing device 702 is configured to execute processing logic (e.g., instructions 726) for performing the operations and steps discussed herein.

The computer system 700 may further include a network interface device 722. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), and a signal generation device 720 (e.g., a speaker).

The secondary memory 718 may include a machine-readable storage medium 724 on which is stored one or more sets of instructions 726 embodying any one or more of the methodologies or functions described herein. The instructions 726 may also reside, completely or at least partially, within the main memory 704 and/or within the processing device 702 during execution thereof by the computer system 700, the main memory 704 and the processing device 702 also constituting machine-accessible storage media.

The machine-readable storage medium 724 may also be used to store a decoy JDBC driver 365, and/or a software library containing methods that call a decoy JDBC driver 365. While the machine-readable storage medium 724 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present invention. The term "machine-readable storage medium" shall accordingly be taken to include, but not be limited to, solid-state memories, and optical and magnetic media.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
  receiving a real service request, generated by a legitimate client, by a designated application server that has access to real data;
  receiving a decoy service request, generated by a dispatcher in response to the real service request, by a computing device executing a decoy application server that does not have access to real data;
  establishing, by the computing device, a connection between the decoy application server and a decoy database connection driver that mimics a database;
  generating false data by the decoy database connection driver after the decoy service request is received by the computing device and in response to the decoy service request, the false data having fictitious contents that are newly created as a result of the generating; and
  providing the false data and the real data to the dispatcher that generated the decoy service request to satisfy the real service request and the decoy service request.

2. The method of claim 1, further comprising:
  loading the decoy database connection driver by a driver manager, wherein the decoy database connection driver is registered with the driver manager as supporting one or more database connectivity protocols.

3. The method of claim 1, further comprising:
  initiating the designated application server on a first computing device;
  establishing a first connection between the designated application server and the database via an additional database connection driver;
  automatically initiating the decoy application server on at least one of the first computing device or a second computing device upon initiating the designated application server; and
  establishing a second connection between the decoy application server and the decoy database connection driver.

4. The method of claim 3, wherein the first computing device hosting the designated application server and the second computing device hosting the decoy application server are deployed in a cluster.

5. The method of claim 1, wherein the decoy application server and the designated application server include instances of a single application server program.

6. The method of claim 5, wherein the single application server program is a Java based application server program.

7. The method of claim 1, wherein the decoy database connection driver is a decoy Java Database Connectivity (JDBC) protocol driver.

8. A computer readable storage medium including instructions that, when executed by a computing device, cause the computing device to perform operations comprising:
  receiving a real service request, generated by a legitimate client, by a designated application server that has access to real data;
  receiving a decoy service request, generated by a dispatcher in response to the real service request, by the computing device executing a decoy application server that does not have access to real data;
  establishing, by the computing device, a connection between the decoy application server and a decoy database connection driver that mimics a database;
  generating false data by the decoy database connection driver after the decoy service request is received by the computing device and in response to the decoy service request, the false data having fictitious contents that are newly created as a result of the generating; and
  providing the false data and the real data to the dispatcher that generated the decoy service request to satisfy the service request and the decoy service request.

9. The computer readable storage medium of claim 8, the operations further comprising:
  loading the decoy database connection driver by a driver manager, wherein the decoy database connection driver is registered with the driver manager as supporting one or more database connectivity protocols.

10. The computer readable storage medium of claim 8, the operations further comprising:
  initiating the designated application server on a first computing device;
  establishing a first connection between the designated application server and the database via an additional database connection driver;
  automatically initiating the decoy application server on at least one of the first computing device or a second computing device upon initiating the designated application server; and
  establishing a second connection between the decoy application server and the decoy database connection driver.

11. The computer readable storage medium of claim 8, wherein the decoy application server and the designated application server include instances of a single application server program.

12. The computer readable storage medium of claim 11, wherein the single application server program is a Java based application server program.

13. The computer readable storage medium of claim 8, wherein the decoy database connection driver is a decoy Java Database Connectivity (JDBC) protocol driver.

14. A system comprising:
  a first memory, to store instructions for a decoy application server that protects a designated application server, wherein the decoy application server does not have access to real data, wherein the designated application server receives a real service request generated by a legitimate client and has access to real data, and wherein the decoy application server and the designated application server include instances of a single application server program; and
  a first computing device having a first processing device to execute the instructions, wherein the instructions cause the first processing device to:
    receive a decoy service request, generated by a dispatcher in response to the real service request;

establish a connection between the decoy application server and a decoy database connection driver that mimics a database;

generate false data by the decoy database connection driver after the decoy service request is received and in response to the decoy service request, the false data having fictitious contents that are newly created as a result of the generating; and provide the false data and the real data to the dispatcher to satisfy the real service request and the decoy service request.

15. The system of claim 14, wherein the instructions further cause the first processing device to load the decoy database connection driver by a driver manager, wherein the decoy database connection driver is registered with the driver manager as supporting one or more database connectivity protocols.

16. The system of claim 14, further comprising:

a second computing device having a second memory to store additional instructions for the designated application server and a second processing device to execute the additional instructions, wherein the additional instructions cause the second processing device to:

initiate the designated application server; and establish a connection between the designated application server and the database via an additional database connection driver;

wherein the instructions in the first memory cause the first processing device to automatically initiate the decoy application server upon the second processing device initiating the designated application server, and to establish a second connection between the decoy application server and the decoy database via the decoy database connection driver, wherein the decoy database does not include real data.

17. The system of claim 16, wherein the second computing device hosting the designated application server and the first computing device hosting the decoy application server are deployed in a cluster.

18. The system of claim 14, wherein the decoy application server and the designated application server include instances of a single application server program.

19. The system of claim 18, wherein the single application server program is a Java based application server program.

20. The system of claim 14, wherein the decoy database connection driver is a decoy Java Database Connectivity (JDBC) protocol driver.

* * * * *